United States Patent
Spitzer et al.

(10) Patent No.: US 7,424,556 B1
(45) Date of Patent: Sep. 9, 2008

(54) METHOD AND SYSTEM FOR SHARING A RECEIVE BUFFER RAM WITH A SINGLE DMA ENGINE AMONG MULTIPLE CONTEXT ENGINES

(75) Inventors: Marc Spitzer, San Jose, CA (US); John Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 177 days.

(21) Appl. No.: 11/245,789

(22) Filed: Oct. 7, 2005

Related U.S. Application Data

(63) Continuation-in-part of application No. 11/234,623, filed on Sep. 22, 2005, which is a continuation-in-part of application No. 11/075,830, filed on Mar. 8, 2005, now abandoned.

(60) Provisional application No. 60/551,531, filed on Mar. 8, 2004.

(51) Int. Cl.
  *G06F 13/28* (2006.01)
  *G06F 13/00* (2006.01)
(52) U.S. Cl. .......................... 710/22; 718/108

(58) Field of Classification Search ............ 710/22–28, 710/52–56, 308–310; 718/108
See application file for complete search history.

(56) References Cited

U.S. PATENT DOCUMENTS

| | | | | |
|---|---|---|---|---|
| 5,428,779 | A * | 6/1995 | Allegrucci et al. | 718/108 |
| 5,659,749 | A * | 8/1997 | Mitchell et al. | 718/108 |
| 6,148,326 | A * | 11/2000 | Born et al. | 718/108 |
| 7,181,548 | B2 * | 2/2007 | Ellis et al. | 710/5 |
| 2005/0228936 | A1 * | 10/2005 | Kuo et al. | 711/1 |

* cited by examiner

*Primary Examiner*—Christopher B. Shin
(74) *Attorney, Agent, or Firm*—Martine Penilla & Gencarella, LLP

(57) ABSTRACT

A method for sharing a buffer among multiple context engines, is provided. The method includes loading a memory element with a first data sequence. The method further includes loading a corresponding first context information to one of the multiple context engines. Subsequently, a direct memory access engine is loaded with the first data sequence dictated by the first context information. Then, the first data sequence is processed. While the first data sequence is being processed, the method includes loading the context engine with a next context information for a next data sequence contemporaneously with the processing of the first data sequence.

13 Claims, 6 Drawing Sheets

METHOD AND SYSTEM FOR SHARING A RECEIVE BUFFER RAM WITH A SINGLE DMA ENGINE AMONG MULTIPLE CONTEXT ENGINES

CROSS REFERENCE TO RELATED APPLICATIONS

The present application is a continuation-in-part and claims priority under 35 U.S.C. § 120 of co-pending application that is commonly assigned to the assignee of the present invention, entitled "Automatic Generators for Verilog Programming", application Ser. No. 11/234,623, filed Sep. 22, 2005, which is a continuation part of application Ser. No. 11/075,830 filed Mar. 8, 2005, now abandoned which claims priority under 35 U.S.C. § 119(e) from U.S. Provisional Patent Application No. 60/551,531, filed Mar. 8, 2004. The disclosures of each application, and the Provisional Application, are incorporated by reference.

BACKGROUND

Direct memory access (DMA) engines are devices that are capable of temporarily taking control of a bus and performing data transfers between various devices. Such data transfer may occur between memories, memories and devices, and devices. DMA engines enhance system performance by freeing the microprocessor from having to do the transfer of data itself. DMA engines generally take a lot of gates to build, which can take up considerable space of a die area. Therefore, it will be advantageous to minimize the number of DMA engines on a die.

In addition, in cases where receiver buffers are involved, conventional methods normally utilized a combined context/DMA engine per buffer. One of the drawbacks to this method is that when the DMA engine works on data associated with a particular context, no data associated other contexts would be allowed in the buffer. Therefore, the I/O interface would be forced to wait while the data associated with a particular context were drained out of the buffer. Once drained, the next set of data associated with another context are loaded into the buffer before the combined context/DMA engine is configured. This resulted in long delays on the DMA engine data transfer interface.

As can be seen, there is a need for a system and method that allows maximum utilization of both the receive buffer and the DMA data transmission interface.

SUMMARY

Broadly speaking, the present invention fills these needs by providing a method and apparatus that allow buffer to be shared among multiple context engines. This method separates the context engine from the DMA engine, allowing multiple context engines to track different data as they move through the buffer. This allows optimal use of the buffer, DMA engine and its data transmission interface while minimizing slowdowns on the input/output (I/O) interface.

It should be appreciated that the present invention can be implemented in numerous ways, including as a process, an apparatus, a system, or a device. Several inventive embodiments of the present invention are described below.

In one aspect of the invention, a method for sharing a buffer among multiple context engines, is provided. The method includes loading a memory element with a first data sequence. The method further includes loading a corresponding first context information to one of the multiple context engines. Thereafter, the method proceeds to load a direct memory access engine with the first data sequence dictated by the first context information. Then, the first data sequence is processed. While the first data sequence is being processed, the method includes loading the context engine with a next context information for a next data sequence, contemporaneously with the processing of the first data sequence.

In another aspect of the invention, a system for efficiently transferring data sequence, is provided wherein, the system includes a storage element. The system further includes a context engine configured to direct transfer of the data sequence from the storage element. In addition, the system includes a status machine that tracks the status of the data sequence transfer. Also included in the system is a direct memory access (DMA) engine in communication with the storage element to receive the data sequence from the storage element dictated by a context information stored in the context engine.

Yet another aspect of the invention includes, a system that maximizes data transmission by switching between two context engines. The system includes a buffer configured to receive a data sequence. The system further includes a direct memory access engine in communication with the buffer. The system also includes at least two context engines configured to direct data sequence transfer between the buffer and the direct memory access engine. Further included with the system is an arbiter which is in communication with the context engines and the arbiter arbitrates between the context engines. Based on the arbitration decision, a determination is made as to the corresponding data sequence, which gets loaded to the DMA engine.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for an apparatus and method for sharing a buffer RAM with a single DMA engine among multiple context engines. The invention allows the DMA engine to pull the data out of a single buffer and switch data between different context engines. When the DMA engine works on a first data sequence associated with a context information stored in a first context engine, the context information associated with the next data sequence may loaded into a second context engine. This way, when the DMA engine finishes working on the first data sequence, the DMA engine may immediately start processing the next data sequence as the DMA engine has the context information readily available. This maximizes the utilization of the receive buffer DMA data transmission interface resulting in low latency.

Figure 1:
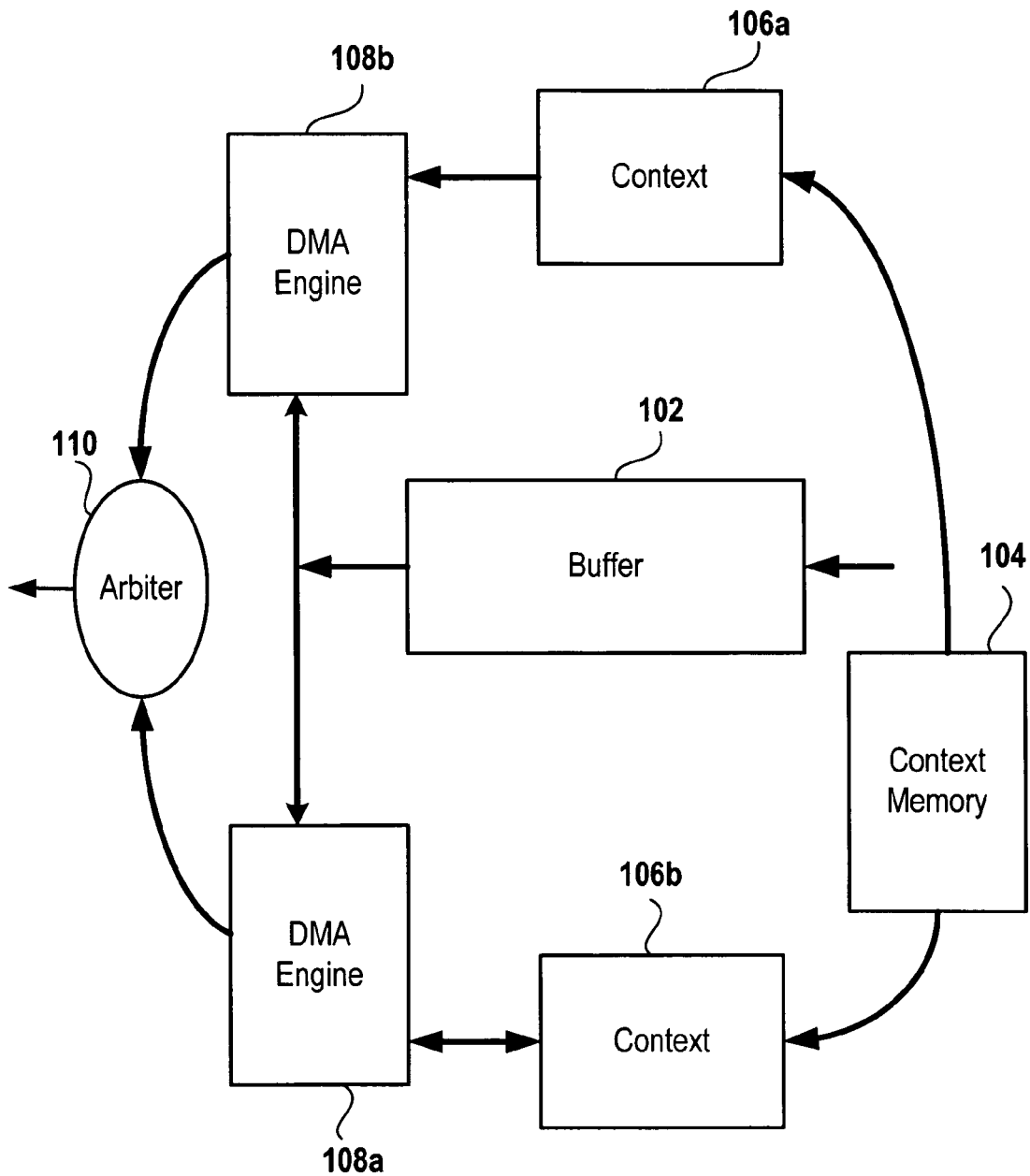
FIG. 1 shows a system that utilizes multiple DMA engines to transfer data.

FIG. 1 shows a system that utilizes multiple DMA engines to transfer data. The system includes context memory 104, context engines 106a and 106b, DMA engines 108a and 108b, buffer 102 and arbiter 110. The data sequence to be transported is loaded into the buffer 102. DMA engines 108a and 108b retrieve the data sequence out of buffer 102 and move the data sequence to the location directed by the context information stored in context engines 106a and 106b. In one embodiment, context information may include the address in the memory to which the data sequence is to be sent from the DMA engine. The context information may also include a count, which provides the length of the data sequence. For example, the count may be the number of bits in the data sequence. Thus, the count may act as fence that separates different data sequences within the buffer. One skilled in the art should understand that the context information may also include other information such as pointers, which retain location within buffers 106a and 106b at which the data sequence for a particular context is kept. Context information for different contexts is stored in context memory 104. Context information is passed onto context engines 106a and 106b as needed.

FIG. 1 also shows an arbiter 110. Arbiter 110 arbitrates between the DMA engines 108a and 108b and based on the arbitration result, provides access to an interface (not shown). The interface may be a memory interface through which the data sequence may be transferred to a memory (not shown). Even though this design provide two context engines 106a and 106b, and two DMA engines 108a and 108b, a bottleneck occurs from the arbiter 110 to the interface. Thus, the design does not work as efficiently as it should.

Figure 2:
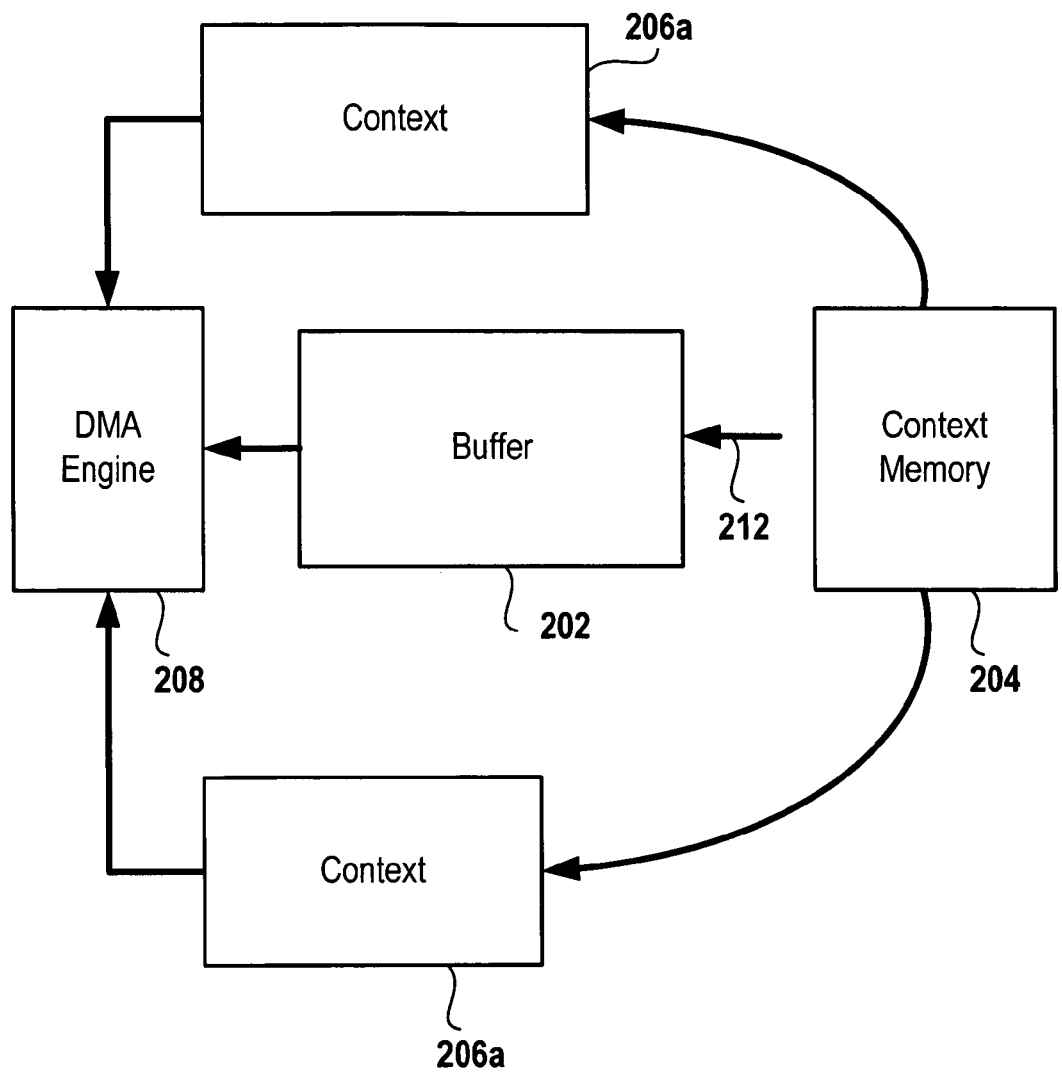
FIG. 2 shows a design for transferring data using DMA engine, in accordance with an embodiment of the present invention.

An alternate design for transferring data is shown in FIG. 2, in accordance with an embodiment of the present invention. In FIG. 2, one DMA engine is provided instead of two. FIG. 2, as shown, includes context memory 204, buffer 202, DMA engine 208 and context engines 206a and 206b. As described above, context memory 204 stores context information for different contexts. Context engines 206a and 206b may access the context memory 204 to obtain different context information for the data sequence in buffer 202. The data sequence to be transferred is loaded into buffer 202, as indicated by arrow 212, and the corresponding context information for the data sequence is loaded into one of context engines 206a or 206b. In this design, when a first data sequence from buffer 202 are transferred to the DMA engine 208 directed by the corresponding context information stored in one of the context engines 206a or 206b, the context information for the next data sequence in buffer 202 may be loaded to the second free context engine so that when the DMA engine completes the processing of the first data sequence, the next data sequence is ready for processing. Thus, there is no time being wasted through a bottleneck, as shown with reference to FIG. 1. Moreover, DMA engine 208 is shared among context engines 206a and 206b, which also saves the number of gates required for having an extra DMA engine.

Figure 3:
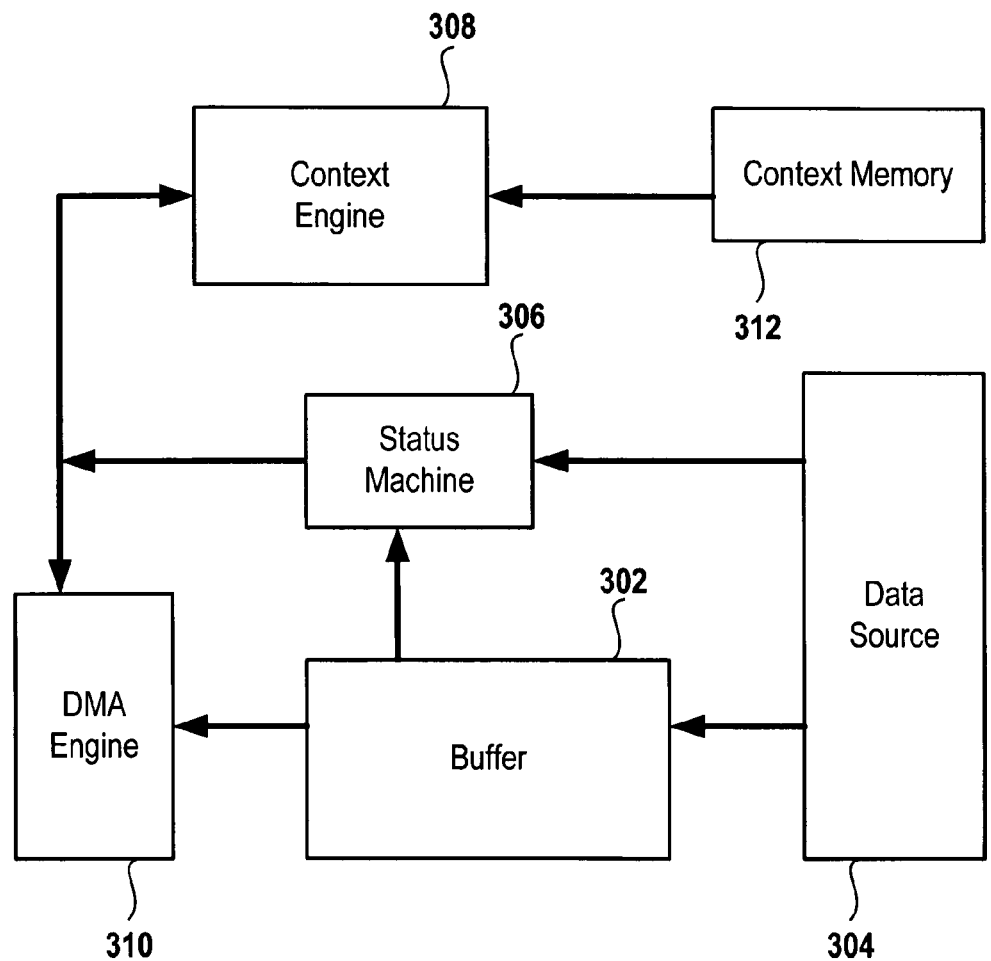
FIG. 3 shows another design for transferring data using a DMA engine in accordance with an embodiment of the present invention.

FIG. 3 shows another design for transferring data in accordance with an embodiment of the present invention. As shown, FIG. 3 includes data source 304, buffer 302, DMA engine 310, status machine 306, context memory 312, and context engine 308. Data source 304 stores a data sequence to be transferred. When the data sequence is being transferred, the data sequence is loaded into buffer 302. Simultaneously, the status of the data sequence is sent to the status machine 306. Status machine 306 keeps track of the status of the data sequence transfer. The data sequence transfer from buffer 302 to the DMA engine 310 is controlled by the context information stored in the context engine 308. Context engine 308 receives the context information from the context memory 312. Status machine 306 indicates when the data sequence for a particular context information is transferred from buffer 302 to DMA engine 310. Once the data sequence transfer occurs, the context engine 308 is free to receive the context information for the next data sequence loaded into the buffer. This way, while the DMA engine 310 processes the transferred data sequence, the context engine 308 may receive the context information for the next data sequence in the buffer. Once the DMA engine completes the processing of the transferred data sequence, the context information for the next data sequence in the buffer is readily available. Therefore, the next data sequence from the buffer may be loaded to the DMA engine immediately after the DMA engine completes of the processing of the transferred data sequence. This in turn prevents any bottleneck that would have occurred at the data sequence transfer interface. The design described above also saves the number of gates required by reducing the number of context engines, arbiter and DMA engines.

Figure 4:
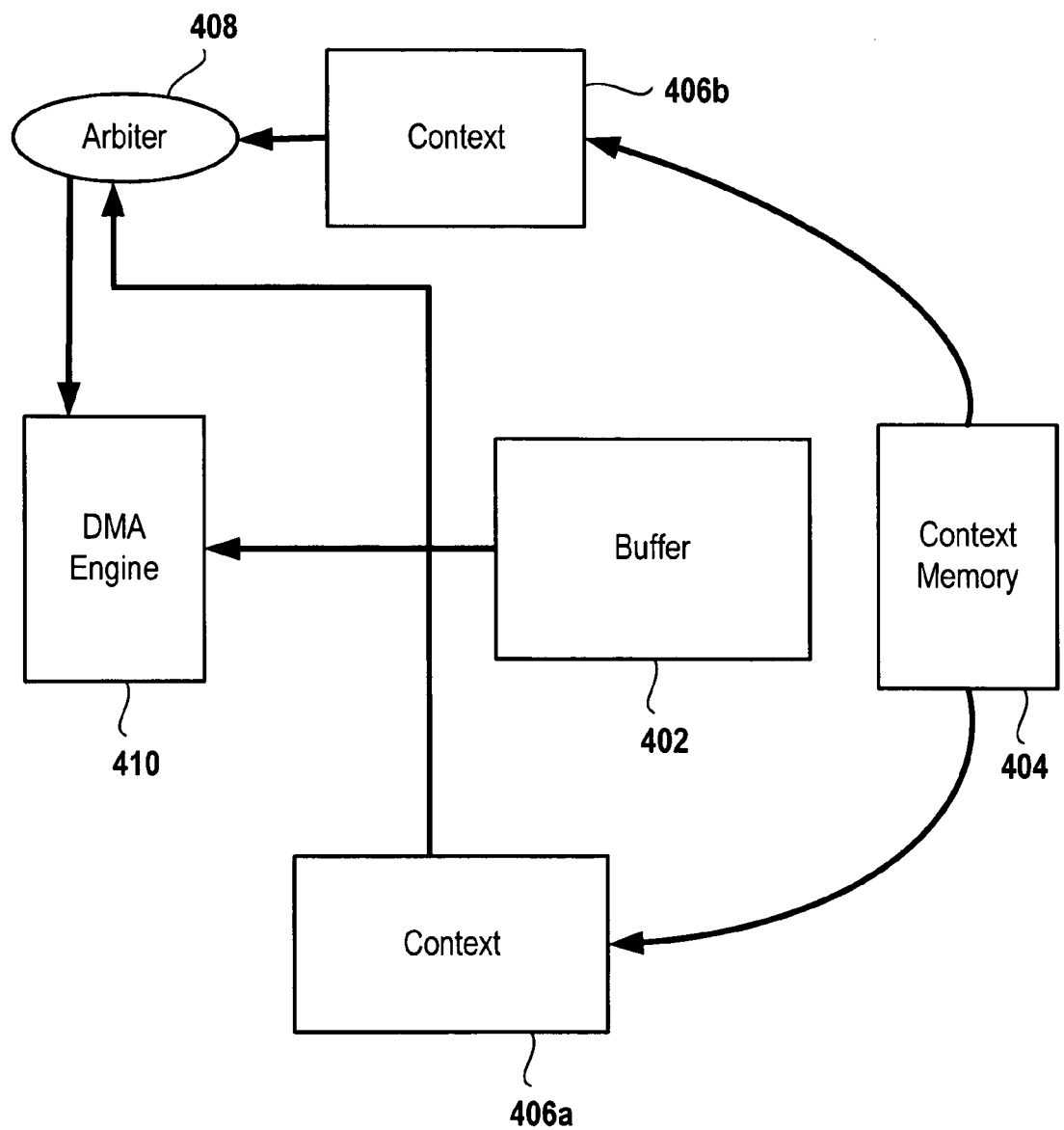
FIG. 4 is an alternative design for transferring data using DMA engine in accordance with an embodiment of the present invention.

FIG. 4 is an alternative design for transferring data using a DMA engine in accordance with an embodiment of the present invention. FIG. 4 includes buffer 402, context memory 404, context engines 406a and 406b, arbiter 408, and DMA engine 410. The arbiter 408 is placed between context engines 406a and 406b and the DMA engine 410. In this design, the arbiter 408 arbitrates between the two context engines and the result of the arbitration determines which one of the context information is used to move the data sequence from the buffer 402 to DMA engine 410. In one embodiment, the arbiter 408 may be a time stamper, which arbitrates by determining which one of the context engines was loaded with the context information first. In another embodiment, the arbiter 408 matches the context information in the context engine with the first data sequence that is ready to be sent out of the buffer 402 to DMA engine 410 and provides passage to the data sequence that matches. Thus, by having two context engines, while the first context information from the first context engine is being used, the second context engine may be loaded with a second context information for the next data sequence in the buffer. This way, once the DMA engine processes the data sequence corresponding to the first context information, the DMA engine may proceed with the next data sequence in the buffer that is corresponding to the second context information.

Figure 5:
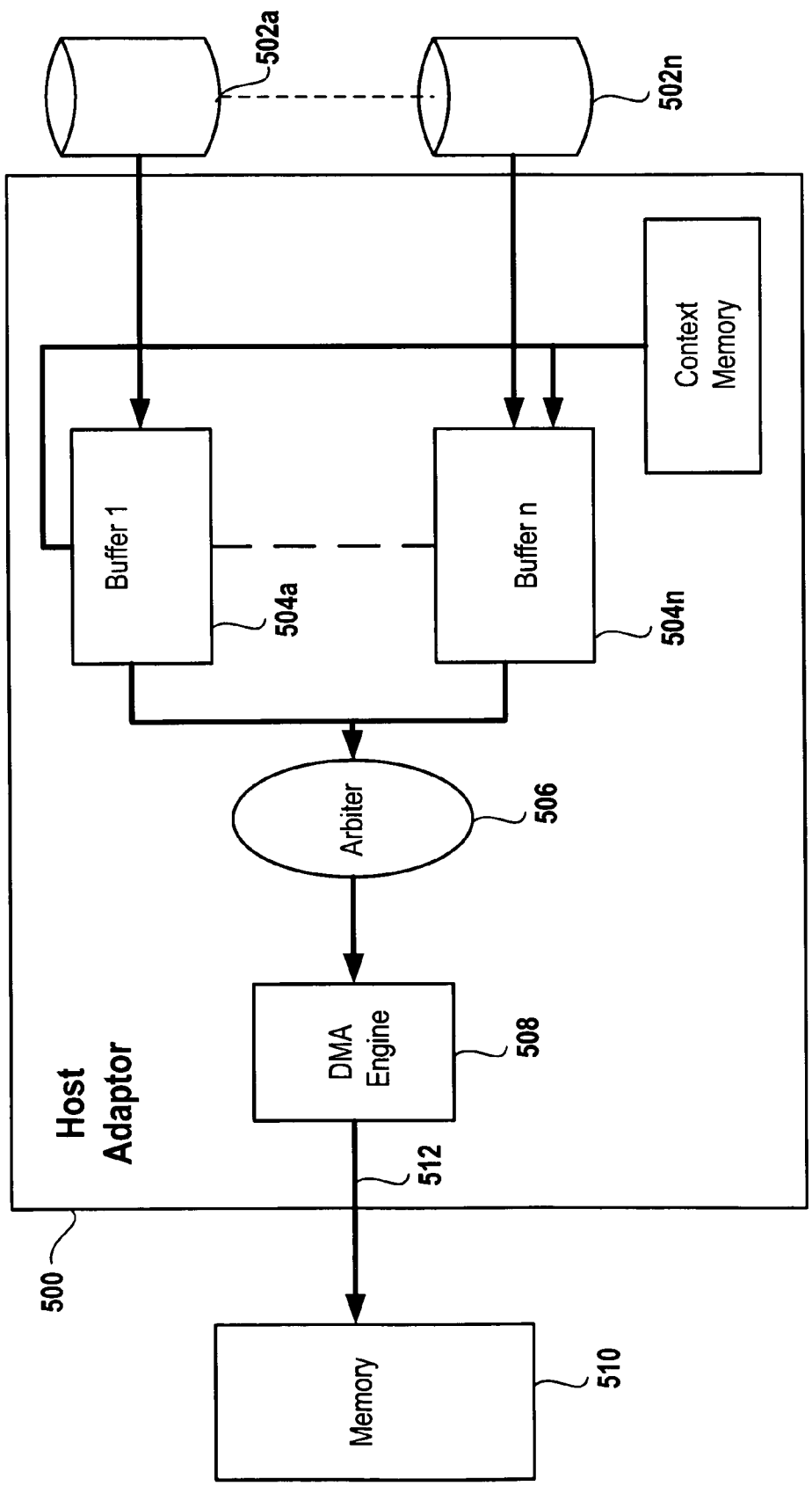
FIG. 5 shows a host adapter that includes a system for transferring data using DMA engine in accordance with an embodiment of the present invention.

FIG. 5 shows a host adapter 500 that includes a system for transferring data using a DMA engine, in accordance with an embodiment of the present invention. FIG. 5 includes storage devices 502a-502n, buffers 504a-504n, arbiter 506, DMA engine 508, and a memory 510. Memory 510 and storage devices 502a-502n are connected to host adapter 500. Storage devices 502a-502n store data sequence to be transferred to memory 510 using DMA engine 508. Data sequence is first loaded into buffers 504a-504n from storage devices 502a-502n. Arbiter 506 arbitrates between the buffers 504a-504n and decides on the data sequence from which buffer is to be sent to DMA engine 508. In one embodiment arbiter 506 is a multiplexer. DMA engine 508 sends the data sequence to memory 510 via memory interface bus 510. This design places the arbiter 506 before the DMA engine 508 in order to avoid any traffic jam at the memory interface bus 512. In this case, data sequence from only one of the buffers is passed onto the DMA engine 508 at any given time. Similarly, when the data sequence from one of the buffers 504a-504n are processed by the DMA engine 508, the context information for the next data sequence in the other buffers may be accessed from context memory 514. This eliminates any delay caused by unloading the context information and then reloading the next context information into the context engine. FIG. 5 is further shown to include context memory 514 that stores context information for the different contexts.

Figure 6:
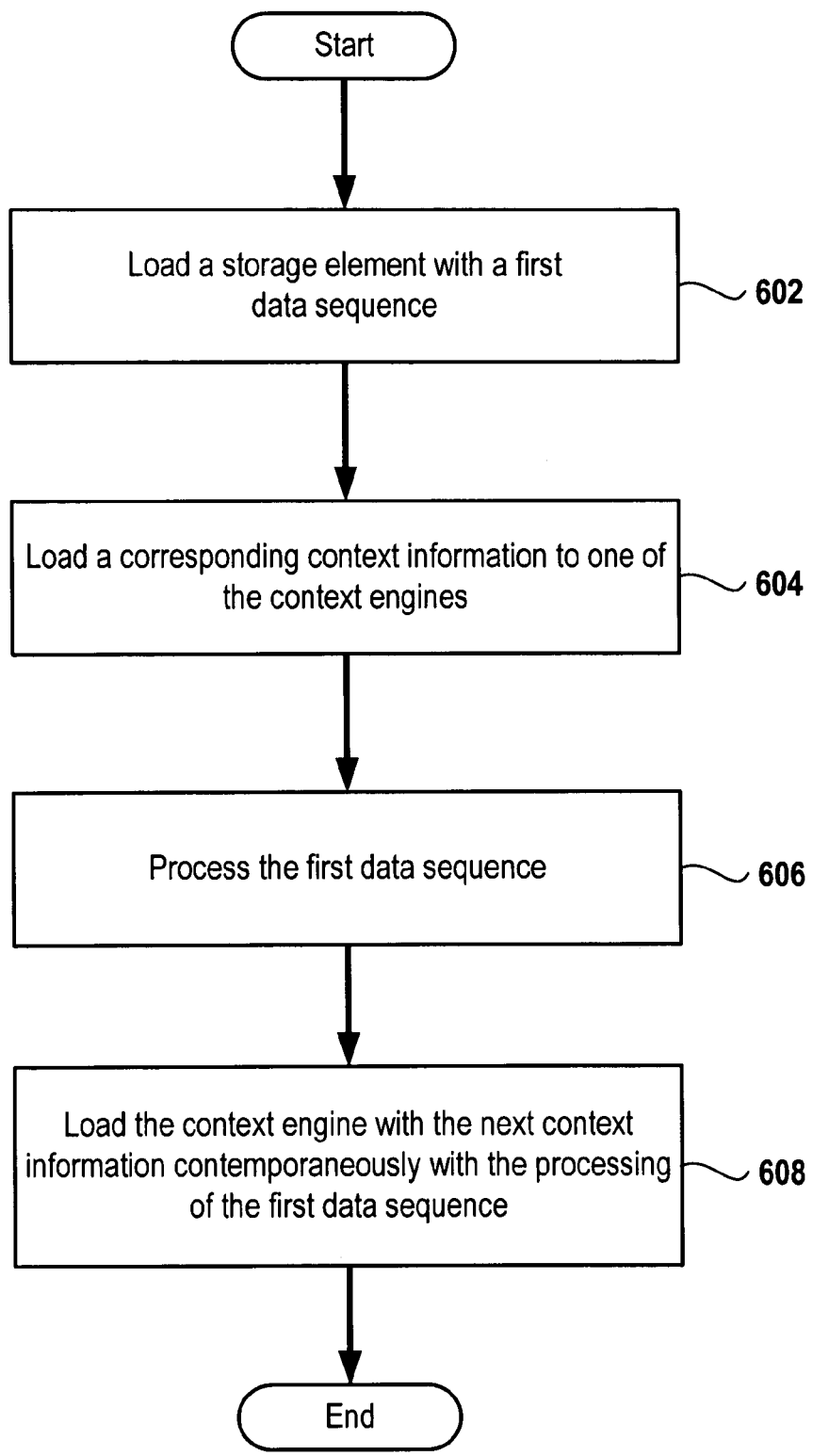
FIG. 6 is a flow chart of the method of operations involved in moving data using a DMA engine in accordance with an embodiment of the present invention.

FIG. 6 is a flow chart of the method of operations involved in moving data using a DMA engine. The method initiates with operation 602 where the data sequence is loaded into a storage element. In one embodiment the storage element is a buffer. One skilled in the art should understand that the data sequence may be loaded into the storage element via an input/output interface. The interface may be a small computer system interface (SCSI), serial attached SCSI (SAS), serial advanced technology attachment (SATA), internet SCSI (iSCSI), fibre channel (FC), integrated drive electronics (IDE), advanced technology attachment (ATA), etc. The method then advances to operation 604, where the context engines are loaded with context information corresponding to the data sequence loaded into the buffer. As described above, the context information may be retrieved from context memory, which stores context information for various contexts. As described above, context information includes the address and count for the data sequence loaded into the storage element. The count could be the number of bits in the data sequence. Context information may also include pointers, which retain the location within the storage element at which the data sequence for a particular context is kept. Context engines are responsible for sending the data sequence to the directed address. The storage element may be configured in a first in first out (FIFO) format necessitating the context engines to finish the data sequence transfer in the order they are activated. As mentioned earlier, the data sequence are transferred to a DMA engine where the data sequence are processed as indicated in operation 606. While the data sequence are being processed by the DMA engine, in operation 608, the context engines are loaded with the context information for the next set of data sequence that are in the storage element.

Since the context information for the next set of data sequence in the storage element is loaded while the DMA engine process the first set of data sequence, this allows the DMA engine to quickly switch between different context engines. The switching results in maximizing the utilization of the DMA engine data transmission interface and low latency. Similarly, the incorporation of multiple context engines into the design, allows maximum utilization of the storage element. The present invention separates the context engine from the DMA engine, allowing multiple context engines to track different data as they move through the storage element. This allows efficient use of the storage element, DMA engine, and the data transmission interface and minimizes slowdowns on the I/O interface.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to share a buffer among multiple context engines, comprising:
    loading the buffer with a first data sequence;
    loading a first context information associated with the first data sequence to one of the multiple context engines;
    loading a direct memory access engine that is shared with the multiple context engines with the first data sequence as directed by the first context information;
    processing the first data sequence through the direct memory access engine; and
    while processing the first data sequence, loading the one of the multiple context engines with a next context information for a next data sequence of the buffer contemporaneously with the processing of the first data sequence.

2. The method of claim 1, further comprising:
    retrieving the first data sequence after the processing; and
    storing the first data sequence in a common resource location.

3. A system for efficiently transferring a data sequence, comprising:
    a storage element storing the data sequence;
    a context engine configured to store context information for the data sequence;
    a status machine configured to determine a status of the transferring of the data sequence; and
    a direct memory access (DMA) engine in communication with the storage element to receive the data sequence from the storage element as directed by the context information.

4. The system of claim 3, further comprising:
    a context memory that stores context information for the data sequence.

5. The system of claim 4 wherein the context information includes, an address to which the data sequence is written to or pulled from.

6. The system of claim 3, wherein the storage element is a buffer.

7. The system of claim 4, wherein the status machine is configured to signal the context to load the context information for a next data sequence to be loaded to the DMA engine.

8. A system that maximizes data transmission by switching between two context engines, comprising:
- a buffer configured to receive a data sequence;
- a direct memory access engine in communication with the buffer;
- at least two context engines configured to direct transfer of the data sequence between the buffer and the direct memory access engine; and
- an arbiter in communication with the context engines, wherein the arbiter is configured to arbitrate between the at least two context engines to select the data sequence corresponding to one of the context engines to be loaded to the direct memory access engine.

9. The system of claim 8, wherein the at least two context engines hold context information for different contexts.

10. The system of claim 9, wherein the context information includes, an address in a memory to which the data sequence is to be forwarded.

11. The system of claim 10, wherein the context information include, a count wherein the count include, the number of bits in the data sequence.

12. The system of claim 8, wherein the arbiter is configured to select the data sequence based on the time the context is loaded into the context engine.

13. The system of claim 8, wherein the arbiter is configured to select the data sequence based on the time the data sequence loaded into the buffer.

* * * * *